US005363238A

United States Patent [19]

[11] Patent Number: 5,363,238

[45] Date of Patent: Nov. 8, 1994

Akune et al.

[54] DIFFRACTION GRATING

[75] Inventors: Yasuhiro Akune; Kichiya Tanino, both of Sanda; Masaru Koeda, Kyoto; Tetsuya Nagano, Kyoto; Kazuo Sano, Kyoto; Eiji Ishiguro, Nara, all of Japan

[73] Assignees: Nippon Packing Co., Ltd., Osaka; Shimadzu Corporation, Kyoto, both of Japan

[21] Appl. No.: 64,912

[22] Filed: May 24, 1993

[51] Int. Cl.[5] .......................... G02B 5/18; G02B 27/44

[52] U.S. Cl. .................................... 359/566; 359/569; 378/70; 378/73

[58] Field of Search ....................... 359/558, 566, 569; 378/34, 35, 36, 70, 71, 73

[56] References Cited

U.S. PATENT DOCUMENTS

| | | | |
|---|---|---|---|
| 3,873,824 | 3/1975 | Bean et al. | 378/35 |
| 4,451,544 | 5/1984 | Kawabuchi | 378/35 |
| 4,608,326 | 8/1986 | Neukermans et al. | 378/35 |
| 5,005,075 | 4/1991 | Kobayashi et al. | 378/35 |
| 5,052,033 | 9/1991 | Ikeda et al. | 378/35 |
| 5,166,962 | 11/1992 | Murooka et al. | 378/35 |
| 5,178,977 | 1/1993 | Yamada et al. | 378/35 |
| 5,234,537 | 8/1993 | Nagano et al. | 359/566 |
| 5,247,557 | 9/1993 | Ikeda | 378/35 |

FOREIGN PATENT DOCUMENTS

| | | | |
|---|---|---|---|
| 63-201656 | 8/1988 | Japan | 378/35 |
| 3-159223 | 7/1991 | Japan | 378/35 |

*Primary Examiner*—Martin Lerner
*Attorney, Agent, or Firm*—Griffin Butler Whisenhunt & Kurtossy

[57] ABSTRACT

The present invention discloses diffraction gratings which do not generate any thermal strain and can perform extremely high-precision and high-efficiency diffraction nearly free from scattered beams. The diffraction gratings are built by allowing the chemically deposited film of silicon carbide whose crystal planes are strongly oriented to the (220) planes in terms of Miller indices to form on the substrate comprising sintered silicon carbide, polishing the surface of the deposited film to 5 Å RMS or less, and directly etched laminar-type grating grooves on that surface by using ion-beam etching.

9 Claims, 2 Drawing Sheets

DIFFRACTION GRATING

FIELD OF THE INVENTION

This invention relates to the diffraction gratings which are suited for a spectrometric element primarily in the soft x-ray region.

PRIOR ART

Conventionally, the following types of diffraction grating are generally known: (1) gratings designed to disperse beams by the diffraction effects caused by Bragg reflections making the best use of the atomic plane spacing "a" in the single silicon crystal, (2) gratings made by directly etching a large number of equally spaced grooves on a quartz substrate by using holographic exposure technique and ion-beam etching method, and (3) gratings made by coating Au or Pt on the quartz substrate and mechanically ruling a large number of equally spaced grooves on the Au- or Pt-coated layer with a ruling apparatus.

However, with respect to method (1), since the lattice constant (grating constant) "a" in the crystalline is limited, no efficient beam dispersion takes place against soft x-rays with wavelength about 10–100 Å. Furthermore, due to its low heat conductivity, silicon tends to give rise to thermal strain against high-intensity x-rays such as SR beams, posing problems in strength. In diffraction gratings using quartz substrate, both gratings (2) and (3) can be used in the range of soft x-ray but provide insufficient thermal conductivity, generating thermal strain against x-rays with high intensity such as SR beams and exhibiting deterioration of light dispersing capabilities.

Therefore, the inventor developed diffraction gratings by forming chemically deposited film of silicon carbide (hereinafter called "CVD-SiC film") on the substrate comprising sintered silicon carbide, polishing the surface of this deposited film, and ruling grating grooves by using etching such as ion etching, ion-beam etching, and chemical etching. With the developed diffraction gratings, since grating grooves are formed on the CVD-SiC film surface by using etching, the grating constant "a" can be freely set and problems of defective spectral diffraction in the above-mentioned soft x-ray region can be solved. Moreover, because the CVD-SiC film provides more excellent heat resistance and thermal conductivity than silicon, it does not give rise to thermal strain against high-intensity x-rays nor produces any problem in strength.

However, since the CVD-SiC film generally has the crystal planes free from orientation as shown in FIG. 4 or exhibits weak orientation to the (111) planes in terms of Miller indices, when grating grooves are formed by using etching, the crystal containing dislocation appears on the etched surface of the grating grooves, and the crystal plane orientation becomes different with the dislocation as boundaries, producing a difference in the etching rate, and inevitably coarsening the groove surface, which is the etched surface. There is also a problem of difficulty in obtaining uniform grooves. This makes it difficult to bring the peak of efficiency to scattering of diffracted beams or to a desired wavelength, producing a problem of low diffraction efficiency.

SUMMARY OF THE INVENTION

The object of the present invention is to provide diffraction gratings which can carry out extremely high-precision high-efficiency diffraction nearly free from scattered beam without causing inconvenience such as generation of large thermal strain even in the range of soft x-ray.

This object can be achieved by forming chemically deposited film of silicon carbide in which the crystal planes are oriented to the (220) planes in terms of Miller indices and the surface RMS roughness is adjusted to 5 Å or less as well as ruling the grating grooves on the surface of this deposited film by using etching. For etching, ion-beam etching, chemical etching, etc. are adopted. The CVD-SiC film can be obtained by chemically depositing high-purity β-type silicon carbide on the substrate surface, but in carrying out the deposition, the (111) planes in terms of Miller indices and other planes are adjusted to be oriented to the (220) planes, and the x-ray diffraction intensity ratio of the (220) planes to the (111) planes and other planes is 99 or more at the peak intensity.

The relation between the width/pitch and the depth of grating grooves formed on the CVD-SiC film surface is an important element for diffraction efficiency, and properly selecting the relation between these two in accordance with the type of the optical system used enables the first-order beam intensity to produce maxima at the desired wavelength, and the 0-order and second-order beam intensity to produce minima. That is, because the spectral intensity of first-order beam becomes great for the spectra of the 0-order and second-order beams, and in actual measurement, the spectral line of first-order beam becomes sharp and S/N improves, high-resolution measurement is enabled. In the range of soft x-ray, the relation may vary in accord with the optical system and wavelength used, but in general, the groove width/groove pitch becomes 0.5–0.6 and the groove depth becomes 10–300 Å. In general, several hundreds to 3000 grooves/mm are selected in accord with the arrangement of the optical system used.

Orienting the crystal planes to the (220) planes eliminates variation of the etching rate due to the difference of crystal plane orientations and produces the extremely smooth etched surface, as well as eliminates variation of groove depth in accord with places. Consequently, the grating grooves have the smooth surface nearly analogous to that without etching, and combined with the super-smoothed CVD-SiC film, the grating grooves exhibit extremely high diffraction efficiency nearly free from scattered beams even to soft x-rays. Because the CVD-SiC film provides excellent heat resistance and thermal conductivity, the diffraction gratings according to this invention is free from any inconvenience such as generation of thermal strain against high-intensity x-rays.

Other objects, features, aspects, and advantages of the present invention will become apparent upon consideration of the following detailed description of the invention when taken in conjunction with the accompanying drawings.

DESCRIPTION OF A PREFERRED EMBODIMENT

Figure 1:
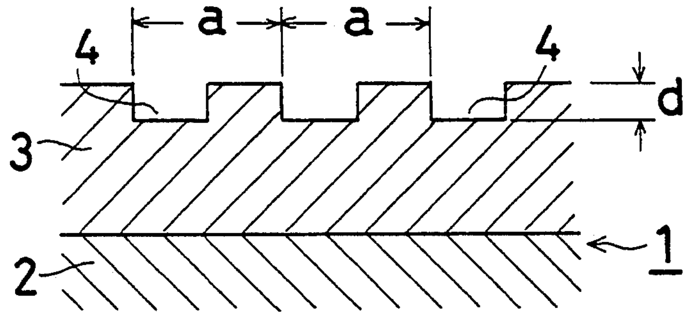
FIG. 1 is a sectional view showing one embodiment of a diffraction grating according to the present invention.
Figure 2A:
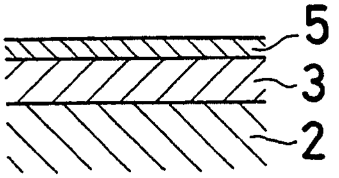
FIG. 2A is a sectional view showing the condition in which resist is coated on the deposited film.
Figure 2C:
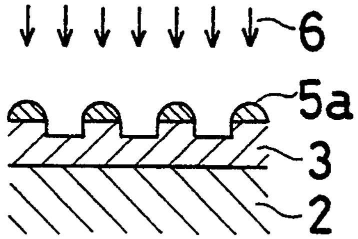
FIG. 2C is a sectional view showing the etching condition by ion-beam.
Figure 2B:
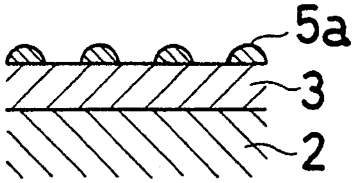
FIG. 2B is a sectional view showing the condition in which a resist pattern is formed.
Figure 2D:
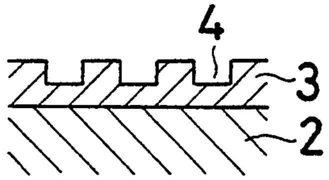
FIG. 2D is a sectional view showing the condition in which the remaining resist is removed.
Figure 3:
FIG. 3 is a Nomarski differential-interference photomicrograph showing the crystal structure on the surface of the CVD-SiC film strongly oriented to the (220) planes at a 500× magnification.
Figure 4:
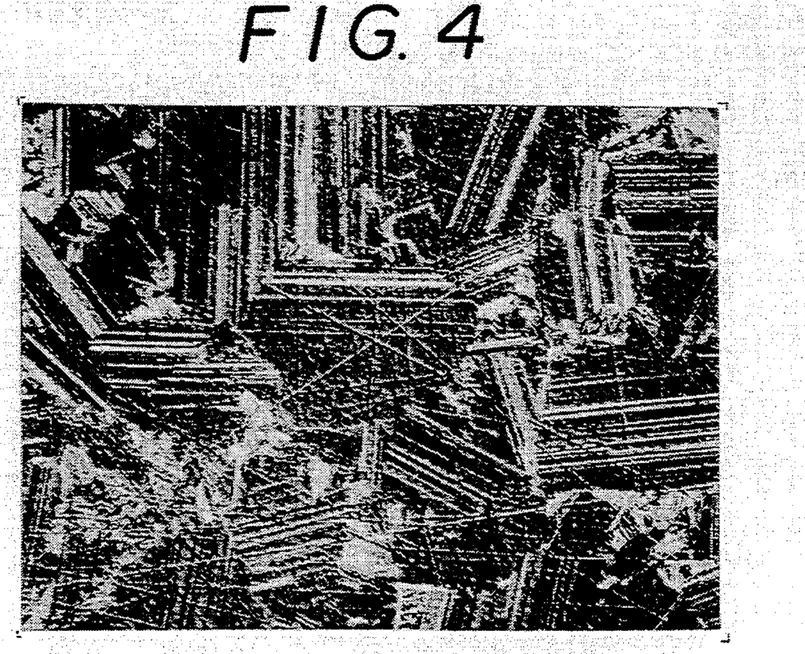
FIG. 4 is a Nomarski differential-interference photomicrograph showing the crystal structure on the surface of the non-oriented CVD-SiC film which is not strongly oriented to the (220) planes at a 500× magnification.

Now, referring to the embodiment shown in FIGS. 1 to 3, the configuration of the present invention is described more in detail.

The diffraction grating 1 of this embodiment comprises straight grating grooves 4 . . . equally spaced on the surface of the CVD-SiC film 3 formed on the substrate 2 as shown in FIG. 1, and is fabricated as follows.

First of all, pure β-type silicon carbide is chemically deposited on the substrate 2 built with sintered silicon carbide, and adjusting the deposition, the CVD-SiC film 3 whose crystal planes are strongly oriented to the (220) planes as shown in FIG. 3 is formed. The x-ray diffraction intensity ratio of the (220) planes to the (111) planes and other planes is 99 or over at the peak intensity.

Next, the CVD-SiC film 3 has the surface polished so that the surface RMS roughness is adjusted to 5 Å or less. Now, because high-purity CVD-SiC is generally highly crystalline and is extremely hard, a great deal of effort is required to polish the surface to obtain a super-smooth surface as described above. Because it requires an extremely high level of polishing energy, the polished surface is likely to break and it is difficult to produce a high-accuracy, smooth surface. However, orienting the crystal planes to specified planes as described above and setting the cleavage planes in order enables polishing the surface to a super-smooth level, while minimizing damage with less polishing energy.

In addition, on the surface of CVD-SiC film 3 polished to the super-smooth level as described above, straight grating grooves 4 . . . are ruled, arranged in parallel at specified groove spacings "a" (grating constant), by using ion-beam etching as shown in FIGS. 2A to 2D.

That is, to the polished surface of CVD-BiC film 3, positive type photo resist OFPR5000 5 is spin-coated at 3000 Å and baked in fresh air oven at 90° C. for 30 minutes to fix resist 5 on film 3 (FIG. 2A).

Then, after holographic exposure using two optical beam interference of He-Cd laser (wavelength λ32 4416 Å), development is carried out with a special-purpose developer, and 1200 grooves/mm of resist pattern 5*a* are formed (FIG. 2B). Now, the cross sectional form of resist pattern 5*a* becomes a sinusoidal half wave. In this event, properly controlling the exposure and the developing time dissolves resist in the developer and enables the ratio of the exposed SiC surface to the portion covered with remaining resist (L and S ratio) to achieve a desired value. This L and S ratio becomes an important factor to finally determine the width ratio of grating grooves of the laminar type diffraction grating to the grating bank.

Next, using this photoresist pattern 5*a* for an etching mask, etching is carried out by ion-beam 6 of $Ar+CHF_3$ mixed gas (mixture ratio: $Ar:CHF_3=67:33$) from the direction normal to the surface of film 3 (FIG. 2C). This selectively etches the exposed portion of CVD-SiC film 3, and since the etching speed is slow for the resist, the majority remains unetched. In this event, strongly orienting the crystal plane of CVD-SiC film 3 to the (220) plane allows extremely smooth high-accuracy grating grooves to form because the etching speed is fast for the (220) plane as compared to other planes and no delay nor increase in etching speed is generated while grooves are being etched.

When the etching depth, that is, grating groove depth "d" reaches a specified value on the surface of the CVD-SiC film 3, irradiation of ion-beams is stopped, then the remaining resist is ashed to remove by $O_2$ plasma, and grating blank after removing resist pattern is washed (FIG. 2D).

In this way, the laminar type diffraction grating 1 is obtained with grating grooves 4 . . . of groove spacing "a"=1/1200 mm, groove width/groove pitch=0.5, and groove depth "d"=75 Å formed on the CVD-SiC film 3 (FIG. 1).

Using this diffraction grating 1, the diffraction efficiency at the soft x-ray region is measured and it is found that the grating is nearly free from scattered beams and exhibits extremely high diffraction efficiency. Inconvenience such as thermal strain does not occur at all.

Having described my invention as related to one embodiment shown in the accompanying drawings, it is my intention that the invention be not limited by any of the details of the description, but numerous and varied other arrangements can be readily devised by those skilled in the art in accordance with those principles without departing from the spirit and scope of the invention. For example, grating grooves 4 . . . can be formed by chemical etching, etc. in addition to ion-beam etching, etc. described above.

What is claimed is:

1. A diffraction grating comprising:

a substrate of sintered silicon carbide;

a film composed of silicon carbide disposed on said substrate;

said film having crystal planes strongly oriented to the (220) planes in terms of Miller indices and a surface roughness of about 5 Å RMS or less; and, a plurality of grating grooves in a surface of said film.

2. A diffraction grating according to claim 1 wherein orientation of the crystal planes is such that the X-ray diffraction intensity ratio of the (220) plane to the (111) and other planes in the deposited film is 99 or over at the peak intensity.

3. A diffraction grating according to claim 1 wherein the grating grooves are straight grooves arranged in parallel at specified groove spacings, the groove width/groove pitch being 0.5–0.6 and the depth of said grooves being 10–300 Å.

4. A diffraction grating according to claim 3 wherein the groove spacing is 1/1200 mm, the groove width/groove pitch is 0.5, and the depth of the grooves is 75 Å.

5. A diffraction grating made by the method comprising the steps of:

providing a sintered silicon carbide substrate;

depositing on said substrate a film of silicon carbide having crystal planes strongly oriented to the (220) planes;

adjusting the surface roughness of said film to 5 Å RMS or less; and, etching grating grooves in the surface of said film.

6. A diffraction grating as claimed in claim 5 wherein said film is deposited by chemical vapor deposition.

7. A diffraction grating as claimed in claim 5 wherein said grating grooves are directly etched by ion-beam etching said film.

8. A diffraction grating as claimed in claim 5 wherein said grating grooves comprise straight grooves with a groove depth of 10–300 Å arranged in parallel at specified groove spacings such that the groove width/-groove pitch is 0.5–0.6.

9. A diffraction grating as claimed in claim 8 wherein said grooves are etched in the surface of said film to a depth of 75 Å with the groove spacing being 1/1200 mm and the groove width/groove pitch being 0.5.

* * * * *